UNITED STATES PATENT OFFICE.

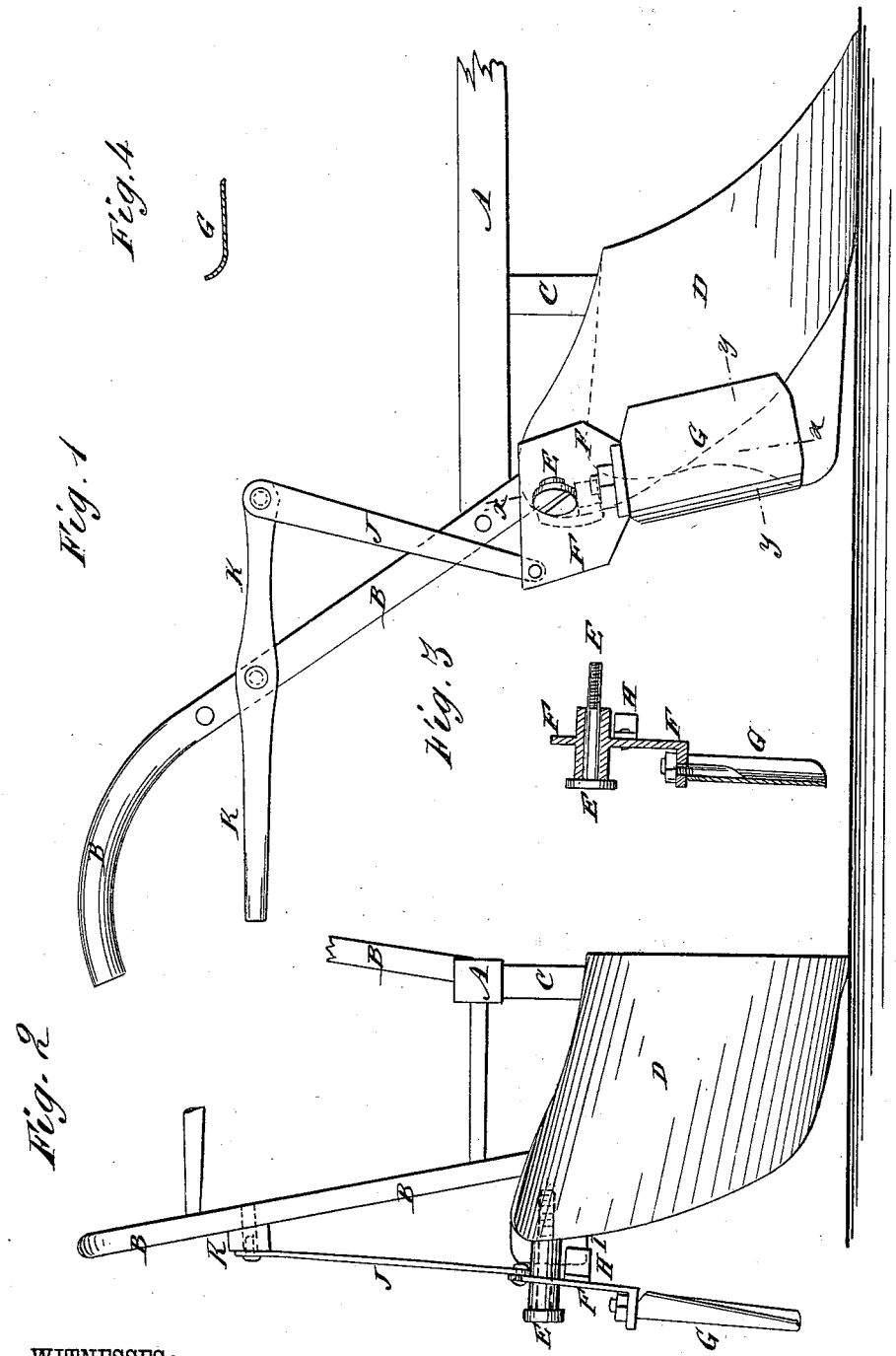

EDWARD WALKER, OF NEW YORK, N. Y., ASSIGNOR TO HIMSELF AND WILLIAM WALKER, OF SAME PLACE.

IMPROVEMENT IN PLOWS.

Specification forming part of Letters Patent No. 212,524, dated February 18, 1879; application filed January 9, 1879.

*To all whom it may concern:*

Be it known that I, EDWARD WALKER, of the city, county, and State of New York, have invented a new and useful Improvement in Plows, of which the following is a specification:

Figure 1 is a side view of a plow to which my improvement has been applied. Fig. 2 is a front view of the same. Fig. 3 is a detail sectional view of the same, taken through the line $x$ $x$, Fig. 1. Fig. 4 is a detail sectional view of the same, taken through the line $y$ $y$, Fig. 1.

Similar letters of reference indicate corresponding parts.

The object of this invention is to improve the construction of the plow for which Letters Patent No. 141,705 were granted to William Donnelly, August 12, 1873, in such a way as to make it more convenient in use.

The invention consists in the combination of the pivoted plate, the connecting-rod, and the lever with the pivot attached to the mold-board, and with the plow-plate and the plow-handle, and in the combination of the projections or stops with the pivoted plate, to which the plow-plate is attached, and with the mold-board, as hereinafter fully described.

A represents the beam, B the handles, C the standard, and D the mold-board, of an ordinary plow.

To the upper rear corner of the mold-board D is attached a pin or bolt, E, to which is pivoted a plate, F, by means of a tubular bearing, to cause it to work squarely upon the said pin or bolt F.

The lower edge of the plate F is bent outward at right angles, and has a hole formed through it, to receive a bolt formed upon or attached to the upper end of the plate G. The plate G is curved or bent into such a shape as to open a channel to receive potatoes or other seed in the plowed soil as the plow is drawn forward.

The plate G may be turned to one or the other side, as may be required, by loosening the nut of the bolt that secures the said plate to the plate F.

To the inner side of the plate F is attached a projection or stop, H, to strike against the projection or stop I, formed upon or attached to the mold-board D, to hold the plate G against the draft-strain as it is drawn through the soil.

To the rear upper corner of the plate F is pivoted the lower end of the connecting-rod J, the upper end of which is pivoted to the forward end of the lever K.

The lever K is pivoted at its middle part to the handle B, and its rear end projects into such a position that it can be conveniently reached and operated by the plowman.

With this construction, by operating the lever K, the plate F will be turned upon its pivot, swinging the plow-plate G forward and upward, so that it will be out of contact with the soil.

Having thus described my invention, I claim as new and desire to secure by Letters Patent—

1. The combination of the plate F, the connecting-rod J, and the lever K with the pivot E, attached to the mold-board D, and with the plow-plate G and the plow-handle B, substantially as herein shown and described.

2. The combination of the projections or stops H I with the pivoted plate F, to which the plow-plate G is attached, and with the mold-board D, substantially as herein shown and described.

EDWARD WALKER.

Witnesses:
 JAMES T. GRAHAM,
 C. SEDGWICK.